US008551653B2

(12) United States Patent
Kepler et al.

(10) Patent No.: US 8,551,653 B2
(45) Date of Patent: Oct. 8, 2013

(54) SECONDARY BATTERY ANODE MATERIAL WITH SELENIUM

(75) Inventors: Keith D. Kepler, Belmont, CA (US); Hongjian Liu, Hercules, CA (US)

(73) Assignee: Farasis Energy, Inc., Hayward, CA (US)

( * ) Notice: Subject to any disclaimer, the term of this patent is extended or adjusted under 35 U.S.C. 154(b) by 817 days.

(21) Appl. No.: 12/315,807

(22) Filed: Dec. 4, 2008

(65) Prior Publication Data

US 2009/0202914 A1 Aug. 13, 2009

Related U.S. Application Data

(60) Provisional application No. 61/005,430, filed on Dec. 4, 2007, provisional application No. 61/194,737, filed on Sep. 30, 2008.

(51) Int. Cl.
H01M 4/13 (2010.01)
(52) U.S. Cl.
USPC ................ 429/218.1; 429/231.8; 429/231.95; 429/231.3
(58) Field of Classification Search
USPC .................... 429/231.8, 231.95, 231.3, 218.1
See application file for complete search history.

(56) References Cited

U.S. PATENT DOCUMENTS

2005/0175901 A1* 8/2005 Kawakami et al. ...... 429/231.95
2006/0121348 A1 6/2006 Mizutani et al.

OTHER PUBLICATIONS

Boukamp, et al., "All-Solid Lithium Electrodes with Mixed-Conductor Matrix", Journal of the Electrochemical Society, vol. 128, No. 4, (Apr. 1981), pp. 725-729.
Kepler, et al., "$Li_xCu_6Sn_5$ (0 < x < 13): An Intermetallic Insertion Electrode for Rechargeable Lithium Batteries", Electrochemical and Solid-State Letters, 2(7), (1999), pp. 307-309.
Michel-Lledos, et al., "Lithium Conductive Selenide Glasses", European Journal of Solid State and Inorganic Chemistry, 29(2), (1992), pp. 301-310.
Pradel, et al., "Structural and Electrical Characterization of Glasses in the System $Li_2Se$—$SiSe_2$ by $^{29}Si$ MAS NMR and Raman Spectroscopy", Solid State Ionics, 53-56, (1992), pp. 1187-1193.
Courtney, et al., "Electrochemical and In Situ X-Ray Diffraction Studies of the Reaction of Lithium with Tin Oxide Composites", Journal of the Electrochemical Society, vol. 144, No. 6, (Jun. 1997), pp. 2045-2052.

(Continued)

Primary Examiner — Zachary Best
(74) Attorney, Agent, or Firm — Blakely Sokoloff Taylor & Zafman LLP

(57) ABSTRACT

Disclosed herein is a composite material for use as an anode for Li-ion batteries and its preparation method and use. The composite material comprises the components represented by the following formula: $M_{a1}$-$X_{a2}$—$Se_{d1}$—$Z_{d2}$—$C_c$, in which, M represents one or more selected from Sn, Al, Pb, Sb, Si and Bi; X represents one or more selected from Cu, V, Co, Ti, Mo, Mg, W and Zn; Z represents Si and/or Ge; and a1, a2, d1, d2 and c represent the weight ratio of M, X, Se, Z and C to the total amount of M, X, Se, Z and C, respectively, wherein a1+a2 is equal to 0.4-0.7, d1+d2 is equal to 0.05-0.6, c is equal to 0.01-0.25, d2/d1 ranges from 0 to 1/1.4, and a2/a1 ranges from 0 to 1/1.5.

11 Claims, 7 Drawing Sheets

(56) References Cited

OTHER PUBLICATIONS

Ulus, et al., "Tin Alloy-Graphite Composite Anode for Lithium-Ion Batteries", Journal of the Electrochemical Society, vol. 149, No. 5, (2002), pp. A635-A643.

Kim, et al., "Reaction Mechanism of Tin Phosphide Anode by Mechanochemical Method for Lithium Secondary Batteries", Journal of the Electrochemical Society, vol. 151, No. 6, (2004), pp. A933-A937.

Bichat, et al., "Electrochemical Reactivity of $Cu_3P$ with Lithium", Journal of the Electrochemical Society, vol. 151, No. 12, (2004), pp. A2074-A2081.

León, et al., "On the Mechanism of the Electrochemical Reaction of Tin Phosphide with Lithium", Journal of the Electrochemical Society, vol. 153, No. 10, (2006), pp. A1829-A1834.

* cited by examiner

SECONDARY BATTERY ANODE MATERIAL WITH SELENIUM

CROSS REFERENCE TO RELATED APPLICATION

This application claims priority from the following U.S. provisional patent applications: (1) "Secondary Battery Material" filed on Dec. 4, 2007, having a U.S. Provisional Patent Application No. 61/005,430; and (2) "High Capacity Battery Material" filed on Sep. 30, 2008, having a U.S. Provisional Patent Application No. 61/194,737. These nonprovisional patent application Nos. 61/005,430 and 61/194,737 are incorporated herein by reference.

FIELD

Embodiments of the invention relate to a composite material for use as the anode for Li-ion batteries, the preparation method thereof, anode electrode and Li-ion batteries using the same.

BACKGROUND

To address the limitations of current Li-ion battery systems a significant amount of research has focused on the development of alternatives to the standard cathode and anode Li-ion intercalation materials. A number of high energy density Li-ion intermetallic anode materials (ex. Al, Si, Sn, Pb, Sb, Cu—Sn, Co—Sn, etc.) have the potential of providing two or more times the energy density of graphitic carbon. [R. A. Huggins, e.a., Journal of the Electrochemical Society, 1981. 128: p. 725] Intermetallic based anodes, particularly with nano-phase morphology, could potentially lead to major advances for Li-ion batteries in energy density, safety and cost. Despite their promise though, most all of the intermetallic anode systems suffer from excessive volumetric expansion, capacity loss and impedance growth as Lithium ions are cycled in and out of the materials. Significant advances have been made to mitigate these issues using both compositional and particle engineering strategies to the point that intermetallic anode materials are just beginning to show up in commercial, high volumetric energy density batteries serving smaller niche markets. In particular, Sony has introduced a Li-ion battery using a nano-particulate Sn—Co—Ti—C anode material (US2006/0121348A1). The material provides a significant volumetric capacity advantage over current graphite anode materials which is realized at the cell level. While a major advance, this material represents only a small step in utilizing the full potential of intermetallic systems. The success of this material has created another broad, industry wide effort to identify and develop intermetallic systems that can provide even greater capacity and performance advantages which will be critical to meet the demands of emerging applications such as EV's, PHEVs, e-Bikes, and UPS backup systems.

From a materials engineering standpoint, it has been clearly demonstrated that limiting the size of the intermetallic anode particles to the nano-scale and increasing the material disorder can significantly improve cycling reversibility, sometimes by an order of magnitude. This works by minimizing the build up of stress in the particles and reducing the impact of inherent particle expansion on material failure modes. It has also been recognized for some time that the most effective way to limit the volumetric expansion of an intermetallic material is to dilute the active component with an inactive phase. This approach avoids the need for lower voltage limits, which are difficult to design into a full cell, and shifts the balance of capacity to lower voltage, thus increasing the average cell voltage. Thus from a compositional standpoint, the question becomes what should the inactive "matrix" comprise to provide the greatest benefit in terms of overall material performance and value. Simple conductive additives like Cu and carbon have been used and in some cases specific intermetallic phases that can accommodate Lithium ions more effectively have been identified. Another approach that has demonstrated promise involves the formation of an insulating, Li-ion conductive phase within the intermetallic material, which along with mitigating the effects of volumetric expansion, improves lithium distribution within the particles and shields the lithitated active phase surface from ongoing reactions with the electrolyte, particle isolation and capacity loss. An early example of this was the development of the glassy Sn-oxide anode materials (Sn in a $Li_2O$ matrix) and more recently the tin phosphide based anode materials that form $Li_3P$, an ion conductive phase, during discharge. While representing significant improvements in performance, these materials still have problems with irreversible capacity loss and cycle life and have not been commercialized. In the case of the phosphide systems, the ion conductive phase, $Li_3P$, is not stable in the normal window of activity for tin based anodes, which limits its effectiveness.

A number of other strategies have been proposed and demonstrated to improve the performance of intermetallic anodes based on modifying the composition of simple, elemental intermetallic materials like Al, Sn, and Si. One example is $Cu_6Sn_5(Fe)$ [K. D Kepler, J. T. V., M. M. Thackeray, Electrochemical and Solid State Letters, 1999. 2 (7): p. 307.]

The above approaches can solve the volumetric changes problem to some extent, however, the cycling performance is still to be improved at a high capacity.

SUMMARY

To improve the cycling performance of the Li-ion batteries at a high capacity, an object of the present invention is to provide a composite material for anode of Li-ion batteries, comprising the components represented by the following formula:

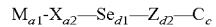

$$M_{a1}\text{-}X_{a2}\text{-}Se_{d1}\text{-}Z_{d2}\text{-}C_c$$

in which, M represents one or more selected from Sn, Al, Pb, Sb, Si and Bi;
X represents one or more selected from Cu, V, Co, Ti, Mo, Mg, W and Zn;
Z represents Si and/or Ge; and
a1, a2, d1, d2 and c represent the weight ratio of M, X, Se, Z and C to the total amount of M, X, Se, Z and C, respectively, wherein a1+a2 is equal to 0.4-0.7, d1+d2 is equal to 0.05-0.6, c is equal to 0.01-0.25, d2/d1 ranges from 0 to 1/1.4, and a2/a1 ranges from 0 to 1/1.5.

In one preferred embodiment, M represents Sn, and Y represents Si.

In one preferred embodiment, d2/d1 is 0 or ranges from 0.05/1.4 to 1/1.4.

In one preferred embodiment, a2/a1 is 0 or ranges from 0.05/1.5 to 1/1.5.

In one preferred embodiment, the composite material has a median particle size ($D_{50}$) of between 5 nm and 15 um, and preferably 0.01 um-1 um. According to this preferred embodiment, the composite material is nano-scale, such that the effect of volumetric changes can be limited, and the cycling performance can be further improved.

In one preferred embodiment, the composite material further comprises Li with a weight ratio of Li to Se in a range of 0.1-2. According to this preferred embodiment, lithium is doped into these materials to pre-form the ion-conductive phase and possibly eliminate any reversible loss associated with it, because of the high equilibrium voltage of formation of the Li$_2$Se phase (~2V vs. Lithium). While Li$_2$Se is water sensitive, at 2.0V it is more stable than other lithium intermetallic materials (LiSb, LiSn etc.) which can not be pre-lithiated and subsequently handled by standard electrode manufacturing techniques.

Another object of the present invention is to provide a method for preparing the composite material above, including the step of mixing and milling M, X, Se, Y and C, wherein the amount of M, X, Se, Y and C is such that the resulting composite material comprises the components represented by the following formula:

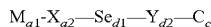

$$M_{a1}\text{-}X_{a2}\text{—}Se_{d1}\text{—}Y_{d2}\text{—}C_c$$

in which, M represents one or more selected from Sn, Al, Pb, Sb, Si and Bi;

X represents one or more selected from Cu, V, Co, Ti, Mo, Mg, W and Zn;

Y represents Si and/or Ge; and a1, a2, d1, d2 and c represent the weight ratio of M, X, Se, Y and C to the total amount of M, X, Se, Y and C, respectively, wherein a1+a2 is equal to 0.4-0.7, d1+d2 is equal to 0.05-0.6, c is equal to 0.01-0.25, d2/d1 ranges from 0 to 1/1.4, and a2/a1 ranges from 0 to 1/1.5.

M, X, Se, Y and C may be provided in their elementary form, respectively, or in form of their alloy containing two or more elements selected from M, X, Se, Y and C.

The elementary C may be any conventional one, and is preferably one or more selected from graphite, carbon black, and acetylene black.

The milling may be performed by any milling method conventionally used in the art as long as the raw materials can be milled homogeneously. For example, the raw materials can be milled in a planetary ball miller. The conditions of the milling can be adjusted suitably to obtain a resulting composite material having a median particle size of between 5 nm and 15 um. In one preferred embodiment, the milling is performed in a planetary ball miller for 5-50 hours at a milling speed of 100-500 rpm.

In one preferred embodiment, the method according to the present invention further includes the step of adding Li during milling to make the composite material comprise Li with a weight ratio of Li to Se in a range of 0.05-2.

Another object of the present invention is to provide an anode electrode for use in Li-ion cells that contains the composite material of this invention and that is cycled reversibly after an initial formation step within a voltage window that is below the voltage of formation of the Li$_2$Se phase.

Still another object of the present invention is to provide a Li-ion battery containing the composite material according to the present invention. The other elements of the second Li-ion cell may be those conventionally used in the art in addition that the composite material according to the present invention is used as anode material.

Using the composite material according to the present invention, the Li-ion battery has a significantly improved cycling performance at much higher capacity compared to the Li-ion battery prepared from the anode material of the prior art.

Other features and advantages of embodiments for the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
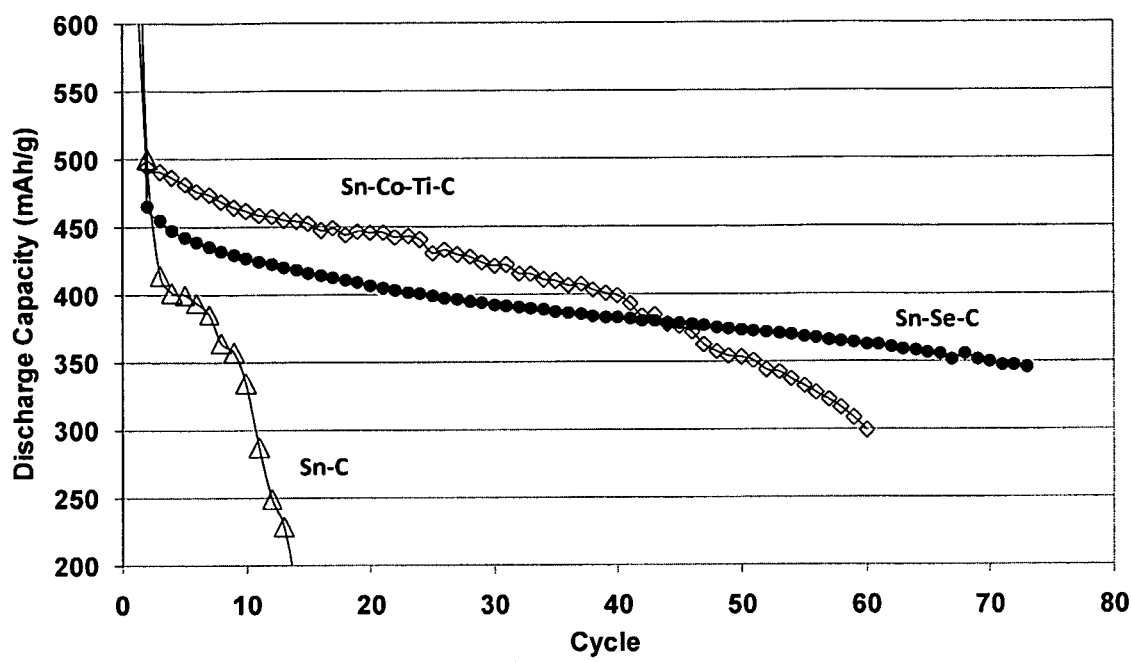
FIG. 1 shows discharge capacity vs. cycle number for several anode materials.

The invention described is a high capacity composite alloy anode material for Li-ion batteries comprised of several components. The general formula of the composite anode material of this invention can be expressed as $M_{a1}\text{-}X_{a2}\text{—}Se_{d1}\text{—}Z_{d2}\text{—}C_c$. In this formula, M is an element that can reversibly react or alloy with lithium ions and, within the composite, acts as the primary active component of the composite. Such elements, M, may include Sn, Al, Sn, Al, Pb, Sb, Si and Bi. In one aspect of this invention, Selenium (Se) in the composite anode material acts to improve the cycle life and reversibility of the active element, M. Selenium may act as a stabilizing agent for reversibly cycling the active component, M, by reacting irreversibly with lithium ions on the first charge to form, in-situ, a stabilizing, Li-ion conductive Li$_2$Se phase within which the active material reversibly cycles. The unique characteristics of the Li$_2$Se phase may impart some stability for the composite material to accommodate large volumetric changes, minimize SEI formation and minimize the loss of lithium into the intermetallic anode material. The Li$_2$Se phase furthermore may form at a voltage (>1 V) outside of the voltage window in which the active phase is cycled so that it remains stable as the active material reversibly reacts with lithium ions. In another aspect of this invention, the anode composite may further comprise an element selected from one of Si or Ge represented as Z within the anode composite formula. These elements may act to enhance the Li-ion conductivity of the in-situ formed Li$_2$Se phase. Li$_2$Se glassy phases doped with Ge and Si have been reported with higher Li-ion conductivity than Li$_2$Se. (Michel-Lledos, V., A. Prade l, and M. Ribes, *Lithium conductive selenide glasses*. Eur. J. Solid State Inorg. Chem. FIELD Full Journal Title:European Journal of Solid State and Inorganic Chemistry, 1992. 29(2): p. 301-10. (Pradel, A., et al., *Structural and electrical characterization of glasses in the system lithium selenide-silicon selenide (Li2Se—SiSe2) by 29Si MAS NMR and Raman spectroscopy*. Solid State Ionics FIELD Full Journal Title:Solid State Ionics, 1992. 53-56(Pt. 2): p. 1187-93).

In another aspect of this invention the composite further may comprise a non-active metal element, X, to dilute the active phase to minimize total volumetric expansion and to decrease the irreversible capacity loss on the first cycle. The elements, X, may be selected from one of more of the following Cu, V, Co, Ti, Mo, Mg, W and Zn. In another aspect of this invention the composite anode material comprises carbon, which may act to simplify the composite synthesis, and to increase electronic conductivity within the composite particles. The composite anode material of this invention provides greater capacity and cycling reversibility compared to the current state of the art.

Hereinafter, the present invention will be described in ways of examples. However, it will be recognized by the skilled in the art that these examples are provided in purpose of illustration rather than limitation to the range of the present invention.

EXAMPLES and 1M $LiPF_6$ EC/DEC (Ethylene Carbonate/Diethyl Carbonate) as the electrolyte. Electrochemical valuations were carried out using these built CR2032 coin cells (CT2001A, LAND Battery Test System, Kingnuo Electronic Co., Ltd.).

Comparative Example 1

Se—Co—C—Ti Intermetallic Composite Anode Material

The intermetallic Sn—Co—C—Ti composite anode materials were made by the same method described in Example 1, except the composition was 52.5% Sn-33.5% Co-10%-C4% Ti by weight, and the cooled container jars were transferred into argon filled golovebox. The materials were collected inside glovebox, and then transferred into a vacuum oven, allowing air slowly vent in.

TABLE 1

Intermetallic Composite Anode Materials

| Example No. | Labeled as in Figures | Voltage Window (V) | Composition (by wt %) | Milling Speed (rpm)/ Milling Time (hr) | Particle size, $D_{10}$ (um) | Particle size, $D_{50}$ (um) | Particle size, $D_{90}$ (um) |
|---|---|---|---|---|---|---|---|
| Example 1 | Sn—Se—C | 0-1.0 | 50%Sn—40%Se—10%C | 225/35 | 0.2 | 2.83 | 6.3 |
| Comparative Example 1 | Sn—Co—C—Ti | 0-1.0 | 52.5%Sn—33.5%Co—10%C—4%Ti | 225/40 | 0.1 | 1.24 | 2.79 |
| Example 2 | Sn—Se—Co—C | 0-1.0 | 50%Sn—20%Se—20%M-10%C, M = Co | 225/35 | 0.15 | 1.81 | 4.2 |
| Example 3 | Sn—Se—V—C | 0-1.0 | 50%Sn—20%Se-20%M-10%C, M = V | 225/25 | 0.88 | 4.25 | 8.26 |
| Example 4 | Sn—SeSi—C | 0-1.0 | 50%Sn—40%($Si_{0.4}Se_{1.4}$)—10% C | 225/40 | 0.1 | 1.56 | 4.47 |
| Example 5 | Sn—CoVCuTi—SeSi—C | 0-1.0 | 50%Sn—25%(CoVCuTi)—15%($Si_{0.4}Se_{1.4}$)—10%C | 225/50 | 0.1 | 0.87 | 2.45 |
| Comparative Example 2 | Sn—CoVCuTi—C | 0-1.0 | 50%Sn—40%(CoVCuTi)—10%C | 225/15 | 1.51 | 5.58 | 9.91 |
| Comparative Example 3 | Sn—C | 0-1.0 | 80%Sn—20%C | 225/15 | 1.6 | 6.2 | 9.8 |
| Comparative Example 4 | ($Se_{1.4}Si_{0.4}$)—C | 0-1.0 | 80%($Se_{1.4}Si_{0.4}$)—20%C | 225/25 | 0.5 | 2.68 | 5.8 |

Example 1

Sn—Se—C Intermetallic Composite Anode Material

The intermetallic Sn—Se—C composite anode materials were made by mechanically alloying the elements of each of material using high energy planetary ball mill. Elemental materials, tin (Sn, Alfa Aesar), selenium (Se, Alfa Aesar), carbon (C, Osaka Gas) were weighed following by the weight percentage 50% Sn—40% Se—10% C, and dry-mixed for 12 hrs (Wheaton Modular Cell Production Roller Apparatus, Model III). 80 g of the pre-mixed Sn—Se—C mixture was then transferred into four stainless steel jars with 400 g stainless steel balls (10 mm in diameter) in each. The sealed jars were set on high energy planetary ball mill machine (ND7-2L Planetary Ball Mill, Tianzhun Co., Ltd.), mixed for 25 hrs, allowing jars cooling down to room temperature prior to opening.

The materials were collected and sieved through 56-90 micron screens (Octagon 200 Test Sieve Shaker), and their particle size was determined (LA500, Horiba, Ltd.) and shown in Table 1. Electrodes were then prepared using 86% active materials, 10% PVDF binder (Solvey) and 4% carbon black (Osaka Gas), forming a slurry with NMP and then coating the slurry onto Cu foil. Electrodes were punched from these coatings and CR2032 type coin cells were built using lithium foil as the counter electrode, a porous PE separator Example 2

Sn—Se-M-C Intermetallic Composite Anode Material (M=Co)

The intermetallic Sn—Se-M-C composite anode materials were made by the same method described in Comparative Example 1, except the composition here was 50% Sn-20% Se-20% M-10% C by weight, where M=Co.

Example 3

Sn—Se-M-C Intermetallic Composite Anode Material (M=V)

The intermetallic Sn—Se-M-C composite anode materials were made by the same method described in Comparative Example 1, except the composition here was 50% Sn-20% Se-20% M-10% C by weight, where M=V.

Example 4

Sn—SeSi—C Intermetallic Composite Anode Material

The intermetallic Sn—SeSi—C composite anode materials were made by the same method described in Comparative Example 1, except the composition here was 50% Sn-40% $(Si_{0.4}Se_{1.4})$-10% C by weight.

Example 5

Sn—CoVCuTi—SeSi—C Intermetallic Composite Anode Material

The intermetallic Sn—SeSi—C composite anode materials were made by the same method described in Comparative Example 1, except the composition here was 50% Sn-25% (CoVCuTi)-15% $(Si_{0.4}Se_{1.4})$-10% C by weight. A specific sample contained 11.55% Co, 7.60% V, 4.15% Cu, and 1.70% Ti in the above composition.

Comparative Example 2

Sn—CoVCuTi—C Intermetallic Composite Anode Material

The intermetallic Sn—SeSi—C composite anode materials were made by the same method described in Comparative Example 1, except the composition here was 50% Sn-40% (CoVCuTi)-10% C by weight. A specific sample contained 10% Co, 23% V, 2% Cu, and 5% Ti in the above composition.

Comparative Example 3

Sn—C Intermetallic Composite Anode Material

The intermetallic Sn—C composite anode materials were made by the same method described in Comparative Example 1, except the composition here was 80% Sn-20% C by weight.

Comparative Example 4

$(Se_{1.4}Si_{0.4})$—C Intermetallic Composite Anode Material

The intermetallic $(Se_{1.4}Si_{0.4})$—C composite anode materials were made by the same method described in Comparative Example 1, except the composition here was 80% $(Se_{1.4}Si_{0.4})$-20% C by weight.

Intermetallic composite anode materials made from the above examples were electrochemically evaluated using the method described in Example 1. The detailed results were summarized in Table 2, and FIG. 1 through FIG. 5.

FIG. 1 shows discharge capacity vs. cycle number for several intermetallic anode materials. The Sn—C material was used as a baseline material for comparison. The Sn—Co—Ti—C (52.5-33.5-4-10 wt %) composition has been reported in the literature and is similar in composition to current commercial anode materials. The Sn—Se—C (50-40-10 wt %) composition is an example of a material of this invention. The cycle life of the material of this invention is much greater and more stable than the other materials.

Figure 2:
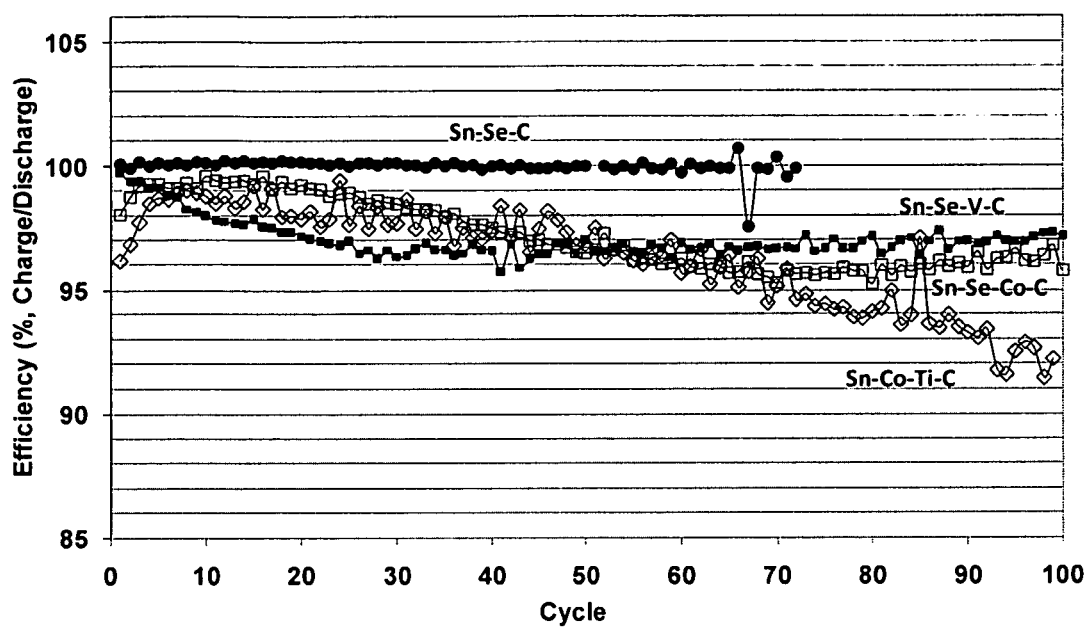
FIG. 2 shows a plot of the efficiency of each cycle vs. the cycle number.

This is more dramatically illustrated in FIG. 2, which shows a plot of the efficiency of each cycle vs. the cycle number. The Sn—Se—C composition has much greater efficiency than the commercial composition indicating that in a full cell using a cathode with a limited supply of lithium the cell would cycle for much longer than a cell using other intermetallic compositions. Other compositions of this invention are also shown including Sn—Se—Co—C (50-20-20-10 wt %) and Sn—Se—V—C (50-20-20-10 wt %) which show greater stabilization of the efficiency as the cell is cycled.

Figure 3:
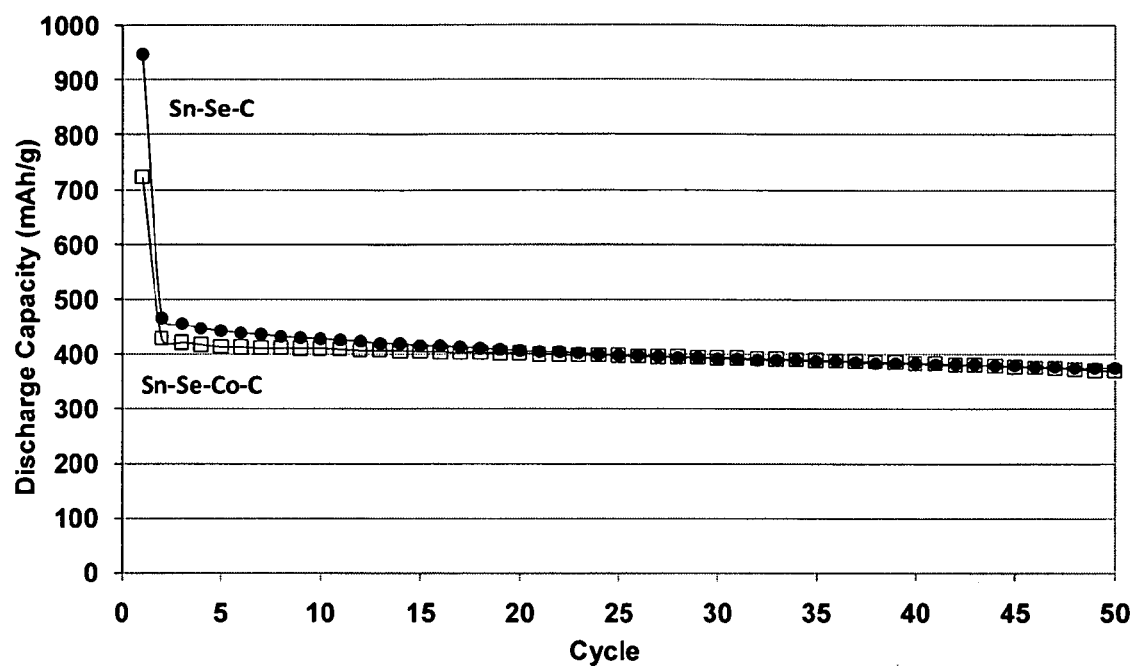
FIG. 3 shows discharge capacity vs. cycle number for several anode materials.

FIG. 3 shows how the irreversible capacity loss associated with a material of this invention can be decreased by the addition of a fourth element, in this case Cobalt, while maintaining a large capacity and stable reversible cycling.

Figure 4:
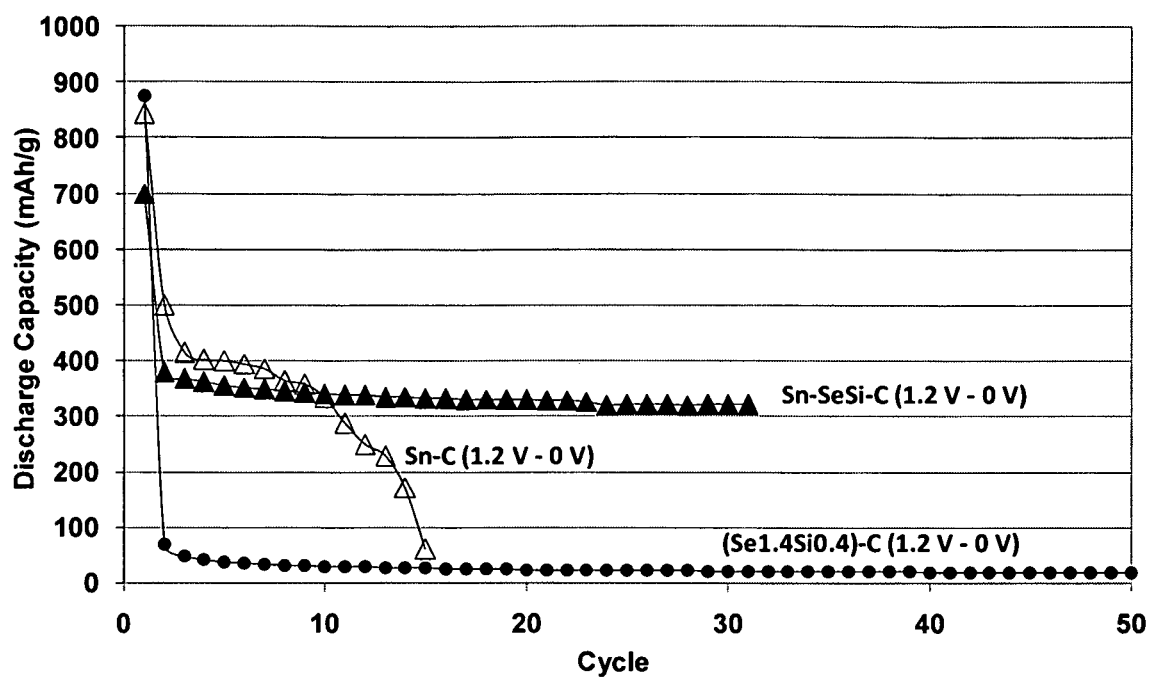
FIG. 4 shows discharge gravimetric capacity for various Sn and Se containing intermetallic anode materials.

FIG. 4 shows discharge gravimetric capacity for various Sn and Se containing intermetallic anode materials. The cycle life of the material of this invention (Sn—SeSi—C) is much greater and more stable than the other materials compared to Sn—C or $(Se_{1.4}Si_{0.4})$—C.

Figure 5:
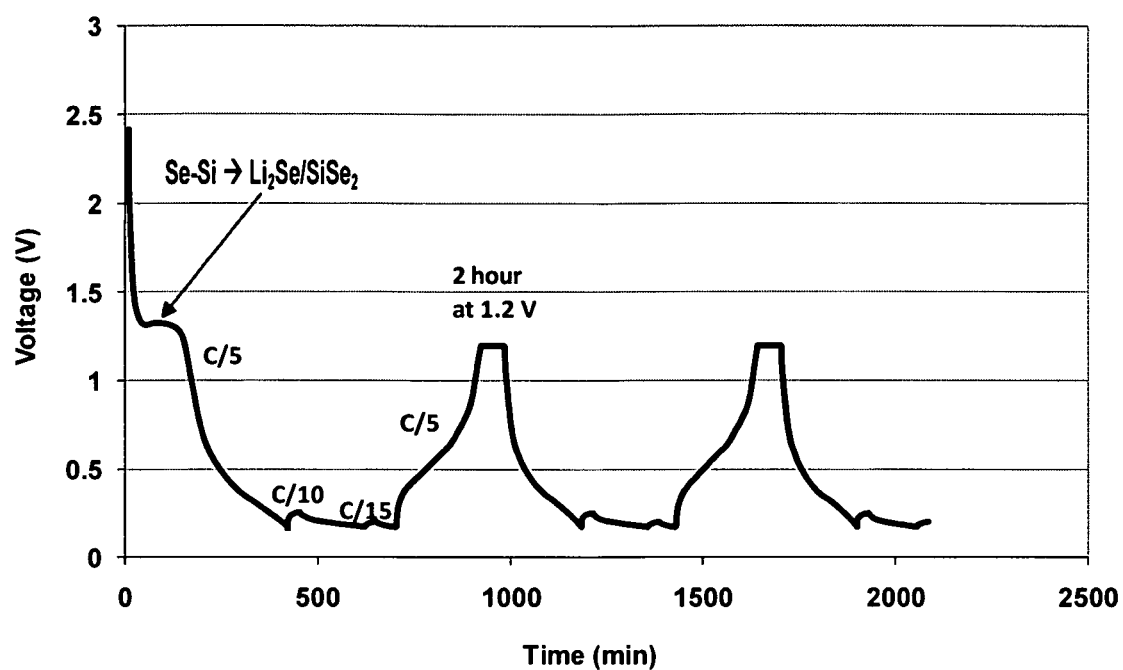
FIG. 5 shows voltage curve for Sn—SeSi—C (50:40:10) anode material.

FIG. 5 shows voltage curve for Sn—SeSi—C (50:40:10) anode material. A voltage plateau observed during the first charge cycle at ~1.2 V is associated with the reaction of the Se component of the anode composite to form an $Li_2Se$ phase. After the first charge cycle the anode is cycled reversibly within a voltage window below the 1.2 V formation voltage of the $Li_2Se$ phase so that it remains electrochemically inactive within the cell.

Figure 6:
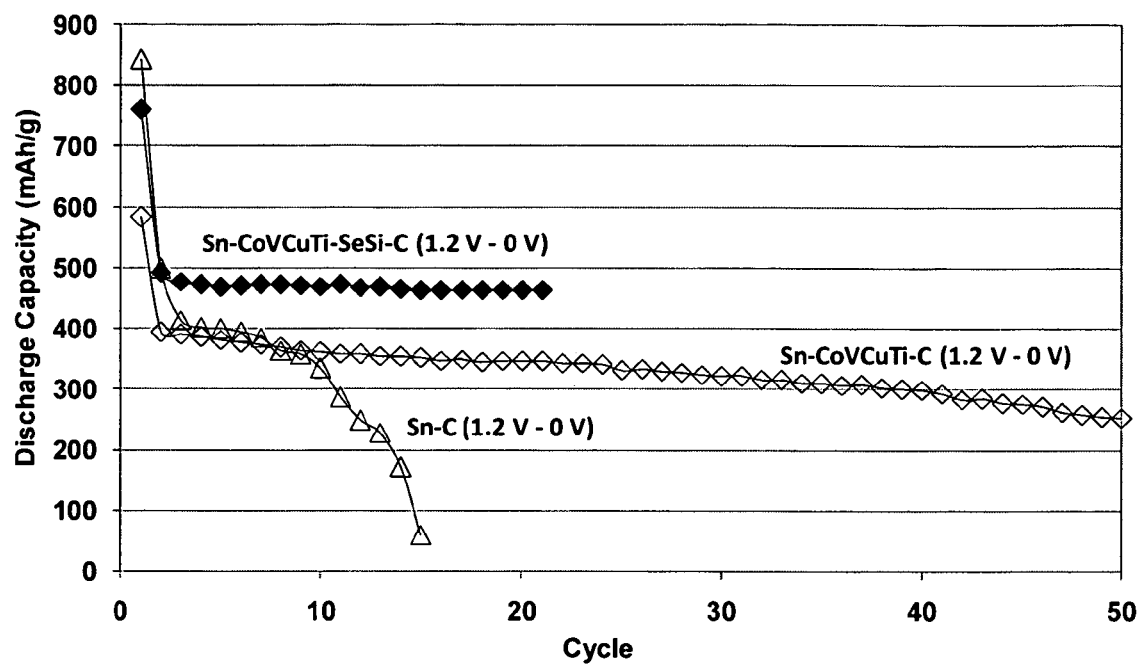
FIG. 6 shows gravimetric capacity vs. cycle for a series of anode materials.

FIG. 6 shows gravimetric capacity vs. cycle for a series of anode materials. The cycle life of the material of this invention (Sn—CoVCuTi—SeSi—C) is much greater and more stable than the other materials compared to Sn—CoVCuTi—C or Sn—C.

Figure 7:
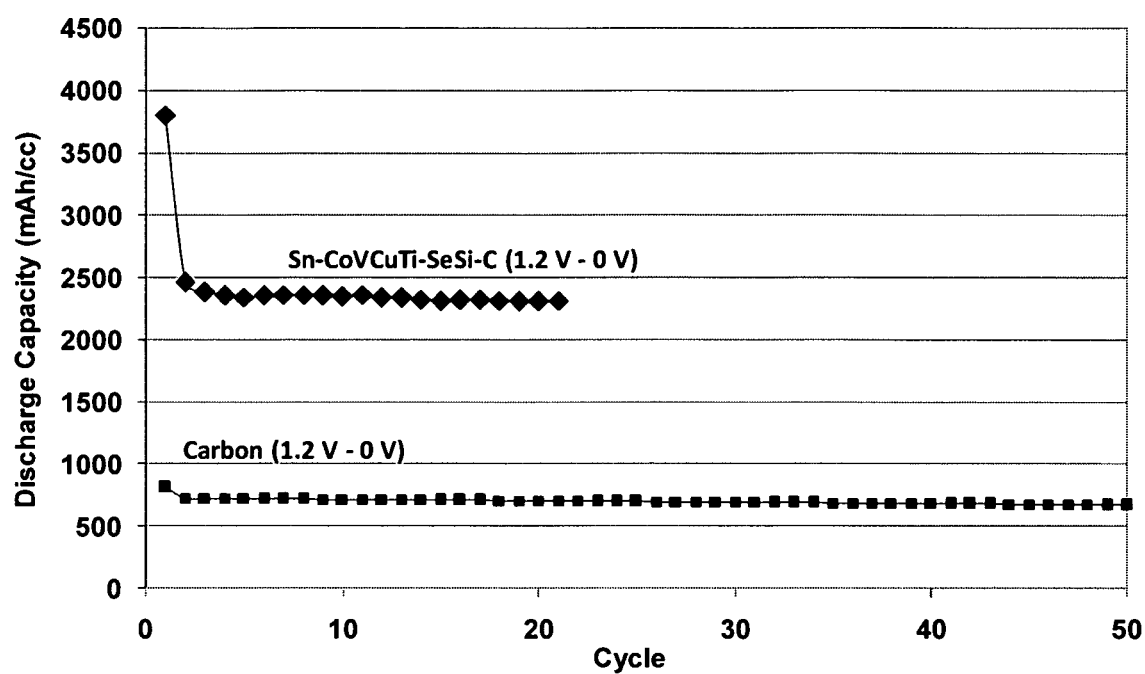
FIG. 7 shows volumetric capacity of best intermetallic material compared to carbon assuming density of ~5 g/cc.

FIG. 7 shows volumetric capacity of best intermetallic material compared to carbon assuming density of ~5 g/cc.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A composite material for anode of Li-ion batteries, comprising the components represented by the following formula

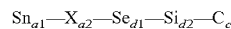

in which,

X represents one or more selected from Cu, V, Co, Ti, Mo, Mg, W and Zn; and a1, a2, d1, d2, and c represent the weight ratio of Sn, X, Se, Si and C to the total amount of Sn, X, Se, Si and C, respectively, wherein a1+a2 is equal to 0.4-0.7, d1+d2 is equal to 0.05-0.6, c is equal to 0.01-0.25, d2/d1 ranges from 0.05/1.4 to 1/1.4, and a2/a1 ranges from 0 to 1/1.5.

2. The composite material according to claim 1, wherein, and X is one or more selected from Cu, V, Co, Ti and Mo.

3. The composite material according to claim 1, wherein a2/a1 is equal to 0.

4. The composite material according to claim 1, wherein a2/a1 ranges from 0.05/1.5 to 1/1.5.

5. The composite material according to claim 1, wherein the composite material has a median particle size of between 5 nm and 15 um.

6. The composite material according to claim 1, wherein it further comprises Li with a weight ratio of Li to Se in a range of 0.05-2.

7. A method for preparing a composite material for an anode of Li-ion batteries, the method comprising:

mixing and milling Sn, X, Se, Si and C, wherein the amount of Sn, X, Se, Si and C is such that the composite material comprises the components represented by the following formula:

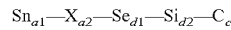

in which,

X represents one or more selected from Cu, V, Co, Ti, Mo, Mg, W and Zn; and a1, a2, d1, d2, and c represent the weight ratio of Sn, X, Se, Si and C to the total amount of Sn, X, Se, Si and C, respectively, wherein a1+a2 is equal to 0.4-0.7, d1+d2 is equal to 0.05-0.6, c is equal to 0.01-0.25, d2/d1 ranges from 0.05/1.4 to 1/1.4, and a2/a1 ranges from 0 to 1/1.5.

8. The method according to claim 7, wherein the milling is performed in a planetary ball miller 5-50 hours at a milling speed of 100-500 rpm.

9. The method according to claim 7, wherein it further includes the step of adding Li during milling to make the composite material comprise Li with a weight ratio of Li to Se in a range of 0.05-2.

10. An anode electrode for lithium ion batteries comprised of a composite material, wherein the composite material is cycled reversibly in a lithium ion cell within a voltage window, said voltage window does not exceed the reaction voltage of the selenium component of the composite material, and the composite material, includes the components represented by the following formula $$Sn_{a1}-X_{a2}-Se_{d1}-Si_{d2}-C_c$$

in which,

X represents one or more selected from Cu, V, Co, Ti, Mo, Mg, W and Zn; and a1, a2, d1, d2, and c represent the weight ratio of Sn X, Se, Si and C to the total amount of Sn, X, Se, Si and C, respectively, wherein a1+a2 is equal to 0.4-0.7, d1+d2 is equal to 0.05-0.6, c is equal to 0.01-0.25, d2/d1 ranges from 0.05/1.4 to 1/1.4, and a2/a1 ranges from 0 to 1/1.5.

11. A Li-ion battery containing a composite material, the composite material comprising the components represented by the following formula $$Sn_{a1}-X_{a2}-Se_{d1}-Si_{d2}-C_c$$

in which,

X represents one or more selected from Cu, V, Co, Ti, Mo, Mg, W and Zn; and a1, a2, d1, d2, and c represent the weight ratio of Sn, X, Se, Si and C to the total amount of Sn, X, Se, Si and C, respectively, wherein a1+a2 is equal to 0.4-0.7, d1+d2 is equal to 0.05-0.6, c is equal to 0.01-0.25, d2/d1 ranges from 0.05/1.4 to 1/1.4, and a2/a1 ranges from 0 to 1/1.5.

* * * * *